(12) United States Patent
Sullivan et al.

(10) Patent No.: US 7,949,305 B2
(45) Date of Patent: May 24, 2011

(54) METHOD AND SYSTEM OF MODIFYING CONFIGURATION SETTINGS OF A DEVICE BASED ON AN ESTIMATED CHANGE IN TRANSMISSION TRAFFIC

(75) Inventors: Marc Sullivan, Austin, TX (US); James Pratt, Round Rock, TX (US); Steven Belz, Cedar Park, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 457 days.

(21) Appl. No.: 12/211,465

(22) Filed: Sep. 16, 2008

(65) Prior Publication Data

US 2010/0069012 A1 Mar. 18, 2010

(51) Int. Cl.
*H04B 17/00* (2006.01)
(52) U.S. Cl. .................. 455/67.11; 455/419; 455/517; 455/551
(58) Field of Classification Search ............ 455/67.11, 455/88, 419, 517, 551
See application file for complete search history.

(56) References Cited

U.S. PATENT DOCUMENTS

| | | | |
|---|---|---|---|
| 6,343,212 B1 | 1/2002 | Weber et al. | |
| 6,898,445 B2 | 5/2005 | Slettengren et al. | |
| 6,970,724 B2 | 11/2005 | Leung | |
| 6,975,874 B1 | 12/2005 | Bates et al. | |
| 7,076,255 B2 | 7/2006 | Parupudi et al. | |
| 2002/0142792 A1 | 10/2002 | Martinez | |
| 2004/0002948 A1 | 1/2004 | Mantyjarvi et al. | |
| 2005/0136837 A1 | 6/2005 | Nurminen et al. | |
| 2006/0116175 A1 | 6/2006 | Chu | |
| 2007/0032225 A1 | 2/2007 | Konicek et al. | |
| 2008/0004043 A1 | 1/2008 | Wilson et al. | |

*Primary Examiner* — Tuan H Nguyen
(74) *Attorney, Agent, or Firm* — Toler Law Group

(57) ABSTRACT

A method of modifying a configuration setting of a portable communication device based on an estimated change in transmission traffic. The method includes monitoring radio frequency (RF) signals at a first portable communication device. The RF signals include signals communicated by one or more other communication devices. The method further includes measuring a first number of transmissions communicated by the RF signals during a first time window and measuring a second number of transmissions communicated by the RF signals during a second time window. The first number of transmissions is compared to the second number of transmissions to estimate a change in transmission traffic. A configuration setting of the first portable communication device is modified from a first setting to a second setting based on the estimated change in transmission traffic.

20 Claims, 5 Drawing Sheets

METHOD AND SYSTEM OF MODIFYING CONFIGURATION SETTINGS OF A DEVICE BASED ON AN ESTIMATED CHANGE IN TRANSMISSION TRAFFIC

FIELD OF THE DISCLOSURE

The present disclosure is generally related to a method and system of modifying configuration settings of a device based on an estimated change in transmission traffic.

BACKGROUND

Configuration settings of devices are normally modified manually, based on an input from a device user. Unfortunately, manual modification relies on the device user to remember to change the settings. Device users often forget to manually adjust device settings, such as changing the ringer mode from audible to vibrate, with potentially embarrassing or annoying consequences.

BRIEF DESCRIPTION

DETAILED DESCRIPTION

Figure 1:
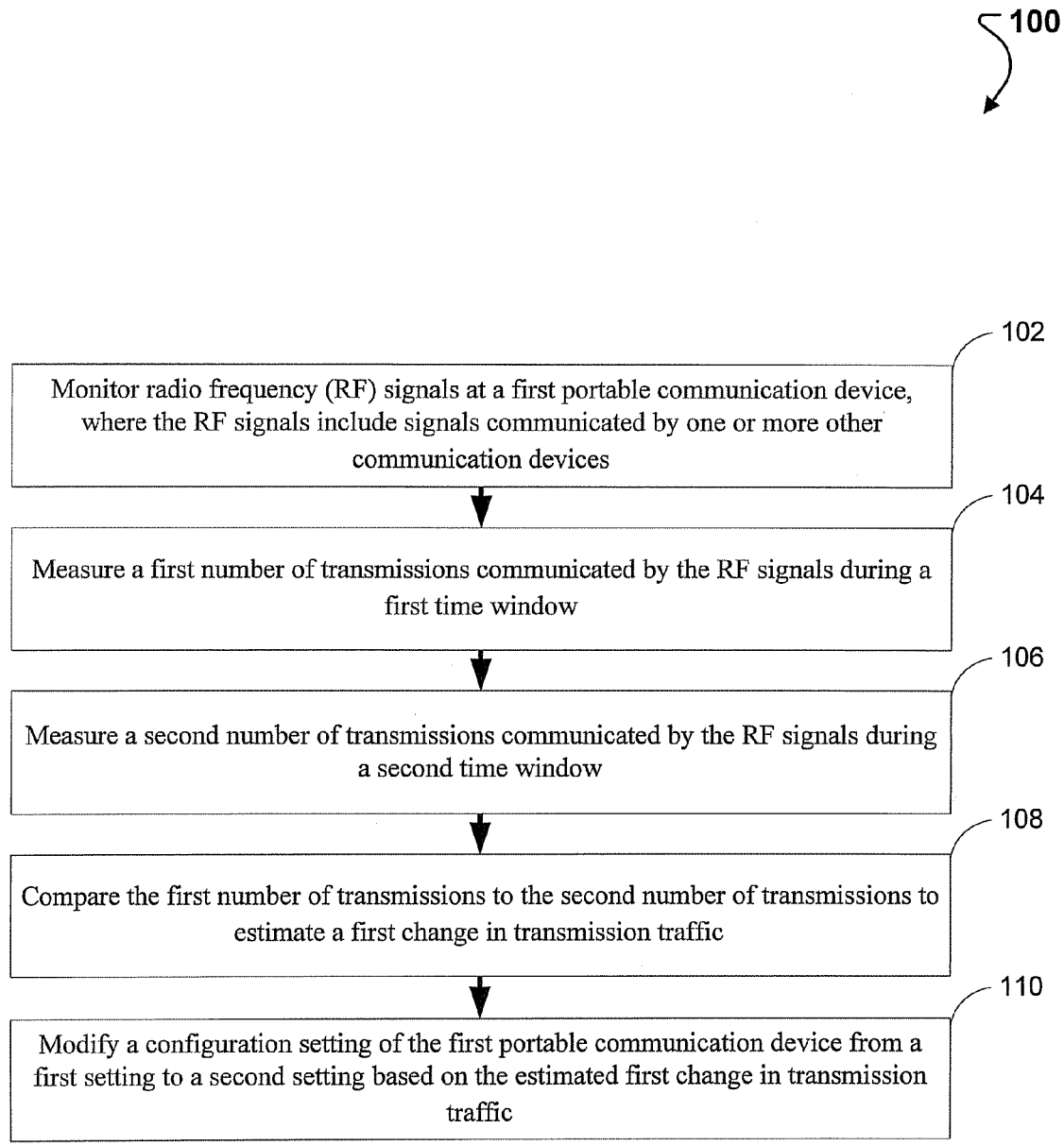
FIG. 1 is a flow chart of an embodiment of a method of modifying a configuration setting of a portable communication device based on an estimated change in transmission traffic of other communication devices.

Electronic devices continue to shrink in size and are becoming less and less obtrusive. Indeed, device users often forget that they have them until they loudly announce their presence in a socially awkward or inappropriate situation. Electronic devices have the capability to alert device users through a variety of methods (e.g., audible ring, vibrate).

The present disclosure describes a method and system of modifying configuration settings, such as ringer volume, ringtone, power up, power down, and vibrate mode of an electronic device based on detected transmissions from other communication devices.

In a particular embodiment, a method includes monitoring radio frequency (RF) signals at a first portable communication device. The RF signals include signals communicated by one or more other communication devices. A first number of transmissions communicated by the RF signals is measured during a first time window. A second number of transmissions communicated by the RF signals are measured during a second time window. The first number of transmissions is compared to the second number of transmissions to estimate a first change in transmission traffic from the other communication devices. A configuration setting of the first portable communication device is modified from a first setting to a second setting based on the estimated first change in transmission traffic from the other communication devices.

In another particular embodiment, a method includes monitoring RF signals at the first portable communication device. The RF signals include signals communicated by one or more other communication devices. During a first time window, a first number of transmissions communicated by the RF signals and a first signal strength of each of the first number of transmissions is measured. A subset of the first number of transmissions is selected for those monitored transmissions where the measured signal strength exceeds a predetermined threshold signal strength. During a second time window, a second number of transmissions communicated by the RF signals and a second signal strength of each of the second number of transmissions is measured. A subset of the second number of transmissions is selected for those monitored transmissions where the measured signal strength exceeds a predetermined threshold signal strength. The number of transmissions in the first subset of transmissions is compared to the number of transmissions in the second subset of transmissions to estimate a first change in proximate device transmission traffic. A configuration setting of the first portable communication device is modified from a first setting to a second setting based on the estimated first change in proximate device transmission traffic.

In a particular embodiment, a portable communication device is disclosed, the device including an RF monitoring module to monitor RF signals. The RF signals include signals communicated by one or more other communication devices. The device also includes a controller module to direct the RF monitoring module. The device also includes an evaluation module including measurement logic and comparison logic. The measurement logic measures a first number of transmissions communicated by the RF signals during a first time window and measures a second number of transmissions communicated by the RF signals during a second time window. The comparison logic compares the first number of transmissions to the second number of transmissions to estimate a change in transmission traffic. The device further includes a user setting control module including logic to modify a configuration setting of the portable communication device from a first setting to a second setting based on the estimated change in transmission traffic.

Referring to FIG. 1, an embodiment of a method of modifying a configuration setting of a portable communication device based on an estimated change in transmission traffic from other communication devices is illustrated, at 100. The method includes, at 102, monitoring radio frequency (RF) signals at the first portable communication device. The RF signals include signals communicated by one or more other communication devices. For example, the first portable communication device may include a mobile phone, a personal digital assistant (PDA), or a laptop computer, among other alternatives. The other communication devices may include other portable communication devices (e.g., mobile phone, PDA, laptop computer), or non-portable communication devices that communicate via RF signals (e.g., base station communication devices, wireless access points, tower transmitters).

In one embodiment, the RF signals are monitored at the first portable communication device without exchanging data between the first portable communication device and any of the other communication devices. The first portable communication device has the capability of monitoring certain radio frequencies and measuring a received signal strength of the received signals that are transmitted over the monitored radio frequencies. For example, a cellular phone includes an antenna, circuitry and control logic that is capable of monitoring one or more control channels and detecting the signal strength of RF signals communicated over the monitored control channels. The first portable communication device can determine that there is control channel activity without determining the specific content of the monitored RF signal traffic communicated over the control channel. Monitoring of the RF signals can be performed without establishing a communications link, exchanging data, or identifying other communication devices. Because data exchange between the first portable communication device and the other communication devices is not required, compatibility at a data exchange layer is also not required. Further, since the first portable communication device does not establish a data exchange connection to any of the other communication devices, power consumption for such monitoring is reduced.

In addition, the various embodiments described herein may be used with portable communication devices using one or more types of wireless communication technology. For example, RF signals may be monitored by scanning for RF signals communicated by the other communication devices via at least one control channel. As a further example, RF signals may be detected by monitoring RF signals communicated by other communication devices via short-range RF signals, such as Bluetooth and Wireless Fidelity (WiFi) signals.

In one illustrative embodiment, the control channel monitored for RF signal transmissions may include a Broadcast Control Channel (BCCH) as specified by the Global System for Mobile (GSM) specification. The BCCH is used to carry information such as a list of frequencies used in a cell, a cell identity, a location area identity, a list of neighboring cells, access control information, and power control information. In another illustrative embodiment, the control channel is a Common Control Physical Channel (CCPCH) as specified in the Code Division Multiple Access (CDMA) specification and the Universal Mobile Telephone System (UMTS) specification. The CCPCH is a broadcast radio channel used by a mobile phone to determine system parameters prior to establishing a dedicated communications link. Other illustrative embodiments include monitoring RF signals provided by a CDMA 2000 system, a Long Term Evolution (LTE) system, a Third Generation (3G) system, a Fourth Generation (4G) system, a Worldwide Operability for Microwave Access (WiMAX) system, a Picocell system, a Femtocell system, an Ultra-wideband (UWB) system, and any other system based on successor standards.

The method includes measuring a first number of transmissions communicated by the RF signals during a first time window, at 104. The method further includes measuring a second number of transmissions communicated by the RF signals during a second time window, at 106. For example, the first time window and second time window may be 30 seconds, 60 seconds, 90 seconds, or any other desired length of time. In a particular illustrative embodiment, the first time window and the second time window are the same length of time. Alternatively, the first time window and second time window may be different lengths of time. Further, the second time window may immediately follow the first time window or the time windows may be spaced apart in time. For example, the second time window may begin 30 seconds, 60 seconds, 90 seconds, or another length of time after the end of the first time window.

The first number of transmissions is compared to the second number of transmissions to estimate a first change in transmission traffic, as shown at 108. The method further includes modifying a configuration setting of the first portable communication device from a first setting to a second setting based on the estimated first change in transmission traffic, at 110. In an illustrative embodiment, modifying the configuration setting of the first portable communication device includes changing a power state of the first portable communication device. For example, changing the power state of the first portable communication device may include changing to a powered-on mode, a standby mode, a limited backlight mode, or a powered-off mode. In another illustrative embodiment, modifying the configuration setting of the first portable communication device includes modifying an alert setting of the first portable communication device. For example, a ringer volume or a ring tone may be modified. As a further example, the alert setting may be switched to an audible alert mode or an inaudible alert mode, such as a vibrate mode or a visual alert mode.

In a particular embodiment, the portable communication device may alert the user or perform a default or user-specified action based on the estimated first change in transmission traffic. In one embodiment, the portable communication device notifies a user that the estimated change in transmission traffic has occurred, and the user is presented with various options. For example, the portable communication device may display a message "Detected an increase in transmission traffic. Do you wish to (1) power down this device, (2) switch to vibrate mode, (3) switch to visual alert mode or (4) remain in this audio alert mode?" In an alternative embodiment, the portable communication device determines a default action or user-preference and performs the default action or user-preference automatically without user interaction. A user may specify user preferences of the configuration settings of the portable communication device. In public locations, such as classrooms, funeral homes, libraries, movie theaters, meeting rooms, concert and performance halls, and churches, an audible alert signal may be considered disruptive or intrusive. In such locations, modifying an alert setting from an audible alert mode to an inaudible alert mode or modifying the power state (e.g., powering down the portable communication device) may be appropriate and convenient. Similarly, in other locations, modifying the alert setting by increasing the ringer volume may be a user preference (e.g., in a noisy subway).

As an example, a user may want her phone to automatically switch to silent mode at the movie theater. During a first time window (e.g., 90 seconds prior to arrival at the movie theater), a low number of transmissions is measured (e.g., less than 5 measured transmissions). As the user passes through the ticket line, a significant increase in the number of transmissions from other communication devices is measured. For example, during a second time window (e.g., 90 seconds after arrival at the movie theater), a high number of transmissions is measured (e.g., more than 200 measured transmissions). The first number of transmissions (e.g., less than 5) is compared to the second number of transmissions (e.g., more than 200) to estimate a first change in transmission traffic. Based on the estimated first change in transmission traffic, the phone may automatically change its configuration from a first setting (e.g., audible alert mode) to a second setting (e.g., inaudible alert mode). During the movie, the phone remains in the inaudible alert mode.

Alternatively, while in the movie theater, a decrease in the number of transmissions from other communication devices may be measured. For example, users of other communication devices may turn off their devices upon entering the movie theater. Based on the estimated decrease in transmission traffic, the phone may change its configuration setting accordingly. Thus, various algorithms may be employed to estimate changes in transmission traffic.

When the user leaves the movie theater, a significant decrease in the number of transmissions from other communication devices is measured. For example, during a third time window (e.g., 90 seconds prior to departing the movie theater), a high number of transmissions is measured (e.g., more than 200 measured transmissions). During a fourth time window (e.g., 90 seconds after departing the movie theater), a low number of transmissions is measured (e.g., less than 5 measured transmissions). The third number of transmissions (e.g., more than 200) is compared to the fourth number of transmissions (e.g., less than 5) to estimate a second change in transmission traffic. Based on the estimated second change in transmission traffic, the phone may automatically change its configuration from the second setting (e.g., inaudible alert mode) to a third setting (e.g., audible alert mode).

As a further example, a user may not want to be disturbed by a mobile phone while at work but may want to maintain communications. During a first time window (e.g., 30 seconds prior to arrival at work), a low number of transmissions from other communication devices is measured (e.g., less than 10 measured transmissions). As the user enters the workplace, a significant increase in the number of transmissions is measured. For example, during a second time window (e.g., during a 30 second time window some time after arrival at work), a high number of transmissions is measured (e.g., more than 100 measured transmissions). The first number of transmissions (e.g., less than 10) is compared to the second number of transmissions (e.g., more than 100) to estimate a first change in transmission traffic. Based on the estimated first change in transmission traffic, the phone may automatically change the alert setting to silent mode for incoming calls and vibrate mode for incoming text messages and emails. When the user leaves the workplace at lunch, a significant decrease in the number of transmissions from other communications devices is measured. The phone may switch the alert setting back to audible mode and optionally provide an audible notification of voicemails (e.g., the presence and the number of voicemails).

Various algorithms may be employed to estimate the change in transmission traffic. For example, a range of radio frequencies may be monitored (e.g., one or more radio frequencies associated with one or more control channels). In one embodiment, a predetermined set of control channels are periodically scanned. In an alternative embodiment, a range of radio frequencies used for short-range transmissions (e.g., Bluetooth or WiFi) are monitored. Any radio frequency signal within the RF range of the wireless transceiver of the portable communication device may be monitored. Similarly, the time window for measuring the number of transmissions for comparison may vary. As noted above, the first time window and second time window may be the same length of time or different time durations. Further, the time window may vary depending on the power state of the portable communication device. As an example, a portable communication device in a sleep state may measure transmissions less frequently or have a shorter monitoring time window than a device in a full powered-on state.

Figure 2:
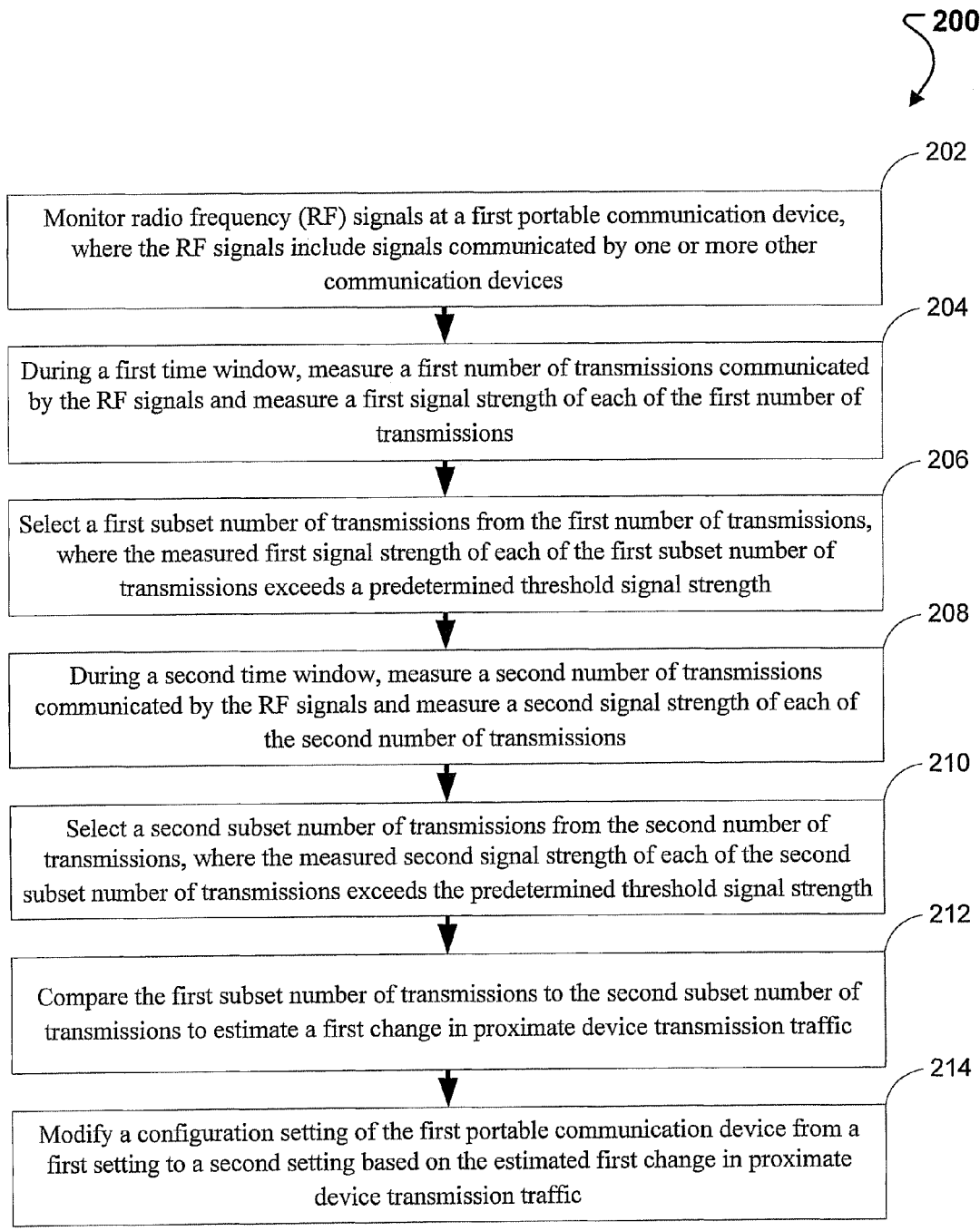
FIG. 2 is a flow chart of another embodiment of a method of modifying a configuration setting of a portable communication device based on an estimated change in transmission traffic of other communication devices.

Referring to FIG. 2, another embodiment of a method of modifying the configuration setting of a portable communication device based on an estimated change in transmission traffic from other communication devices is illustrated, at 200. The method includes, at 202, monitoring RF signals at a first portable communication device. The RF signals include signals communicated by one or more other communication devices. During a first time window, a first number of transmissions communicated by the RF signals and a first signal strength of each of the first number of transmissions are measured, at 204. A subset of the first number of transmissions is selected for those monitored transmissions where the measured signal strength exceeds a predetermined threshold signal strength, at 206. During a second time window, a second number of transmissions communicated by the RF signals and a second signal strength of each of the second number of transmissions are measured, at 208. A subset of the second number of transmissions is selected for those monitored transmissions where the measured signal strength exceeds a predetermined threshold signal strength, at 210.

The number of transmissions in the first subset of transmissions is compared to the number of transmissions in the second subset of transmissions to estimate a first change in proximate device transmission traffic (i.e., a change in the number of detected transmissions from other communication devices having a high signal strength measurement), at 212. A configuration setting of the first portable communication device is modified from a first setting to a second setting based on the estimated first change in proximate device transmission traffic, at 214. A strong measured signal strength (e.g., more than −45 decibels (db)) may indicate that the source of the transmission is in close proximity to the portable communication device. Similarly, a weak measured signal strength (e.g., less than −70 db) may indicate that the source of the transmission is not in close proximity to the portable communication device. Thus, the measured signal strength may be used to estimate the proximity of the other communication device to the portable communication device. In some locations, there may be a large number of measured transmissions, but the signal strength of the transmissions may indicate that the other communication device sources are not in close proximity to the portable communication device.

In an illustrative embodiment, the predetermined threshold signal strength may be used to exclude transmissions with weak signal strength from the estimated traffic change measurement. For example, in a downtown area, the total measured number of transmissions may be high (e.g., 200 transmissions in a 90 second time window). However, only a subset of those transmissions (e.g., 10 transmissions) has a measured signal strength above the predetermined threshold signal strength (e.g., −45 db). The remainder of the transmissions (e.g., 190 transmissions) have weak measured signal strength. These weak signal strength transmissions may be excluded from a transmission traffic change estimation. Excluding the weak signal strength transmissions may prevent the configuration settings from being modified in locations where the other communication devices are widely dispersed and not in close proximity to the portable communication device. For example, in a downtown area with widely dispersed communication devices, an audible alert signal may not be considered disruptive or intrusive. Modifying a configuration setting of the portable communication device (e.g., changing to an inaudible alert mode) may not be appropriate or convenient in this situation.

In another illustrative embodiment, the predetermined threshold signal strength may be used to determine a weighting factor for the transmission. The weighting factor may be used to select the subset number of transmissions from the total number of measured transmissions. For example, strong measured signal strength transmissions (e.g., more than −45 db), moderate measured signal strength transmissions (e.g., between −45 db and −70 db), and weak measured signal strength transmissions (e.g., less than −70 db) may each have different weighting factors. For example, the total measured number of transmissions may be high (e.g., 200 transmissions in a 90 second time window). A first portion of the total number of transmissions (e.g., 10 transmissions) has strong measured signal strength (e.g., above −45 db). A second portion (e.g., 50 transmissions) has moderate measured signal strength (e.g., between −45 db and −70 db). A third portion (e.g., 140 transmissions) has weak measured signal strength (e.g., less than −70 db). As an example, for purposes of estimating a change in transmission traffic, a first weighting factor may be used for the strong transmissions, a second weighting factor may be used for the moderate transmissions, and a third weighting factor may be used for the weak transmissions. For example, the first weighting factor may be 100 percent, resulting in all of the strong measured signal strength transmissions (e.g., 10 out of 10 strong measured signal strength transmissions) being included in the subset number of transmissions selected from the total number of transmissions. The second weighting factor may be 50 percent, resulting in half of the moderate measured signal strength transmissions (e.g., 25 out of 50 moderate measured signal strength transmissions) being included in the subset number of transmissions selected from the total number of transmissions. The third weighting factor may be 10 percent, resulting in a tenth of the weak measured signal strength transmissions (e.g., 14 out of 140 weak measured signal strength transmissions) being included in the subset number of transmissions selected from the total number of transmissions. Thus, in this example, the subset number of transmissions selected from the total number of transmissions includes 49 transmissions (e.g., 10 strong, 25 moderate, and 14 weak) selected from 200 total measured transmissions. Various algorithms may be employed to assign different weighting factors to the transmissions based on the measured signal strength.

Figure 3:
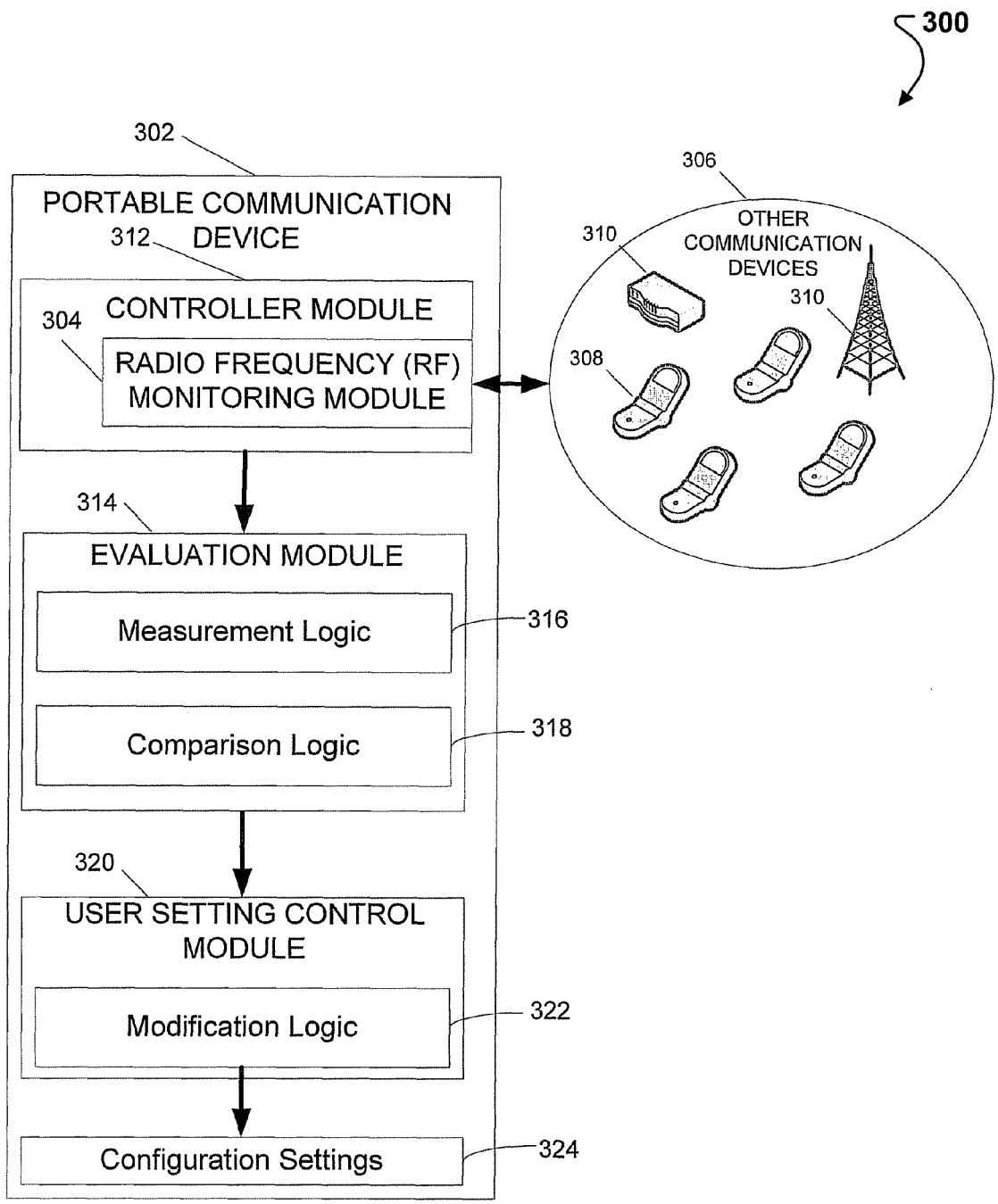
FIG. 3 is a view of an embodiment of a portable communication device adapted to modify a configuration setting based on an estimated change in transmission traffic of other communication devices.

Referring to FIG. 3, a view 300 is shown of an embodiment of a portable communication device 302 adapted to modify its configuration settings based on an estimated change in transmission traffic from other communication devices. The portable communication device 302 includes an RF monitoring module 304 that monitors RF signals, including RF signals communicated by one or more other communication devices 306. In a particular embodiment, the one or more other communication devices 306 include one or more portable communications devices 308 (e.g., mobile phones). In an alternative embodiment, the one or more other communication devices 306 include one or more non-portable communication devices 310 (e.g., base station communication devices, wireless access points, transmitter towers). In one illustrative embodiment, the RF monitoring module 304 monitors the RF signals without exchanging data between the portable communication device 302 and any of the other communication devices 306.

A controller module 312 directs actions of the RF monitoring module 304. In one illustrative embodiment, the controller module 312 directs the RF monitoring module 304 to periodically scan a predetermined set of control channels. In another illustrative embodiment, the controller module 312 directs the RF monitoring module 304 to scan a range of frequencies used for short-range transmissions. The portable communication device 302 further includes an evaluation module 314 including measurement logic 316. The measurement logic 316 measures a first number of monitored transmissions of RF signals during a first time window and measures a second number of monitored transmissions of RF signals during a second time window. The evaluation module 314 further includes comparison logic 318 that compares the first number of monitored transmissions to the second number of monitored transmissions to estimate a first change in transmission traffic.

The portable communication device 302 further includes a user setting control module 320 that includes modification logic 322 to modify a configuration setting 324 of the portable communication device 302 based on the estimated first change in transmission traffic. In a particular embodiment, the user setting control module 320 is implemented using a virtual machine. In one embodiment, the virtual machine is a JAVA virtual machine (JVM), allowing the user setting control module 320 to be implemented on multiple hardware and software platforms. The JVM may be used to execute a JAVA Specification Request (JSR) applet program (e.g., a JSR 211 applet). The JSR 211 applet provides the user setting control module 320 access to the native user controllable device configuration settings 324, so that the configuration settings (e.g., alert mode or power state) of the portable communication device 302 can be modified under software control. In an alternative embodiment, the user setting control module 320 may include a Terminal State Resident (TSR) application (e.g., a resident application that runs without a user interface). In one embodiment, the user setting control module 320 is installed by the manufacturer of the portable communication device 302. In an alternative embodiment, the user setting control module 320 includes software that is downloaded and installed on the portable communication device 302. For example, a JAVA application may be downloaded to the portable communication device 302.

Figure 4:
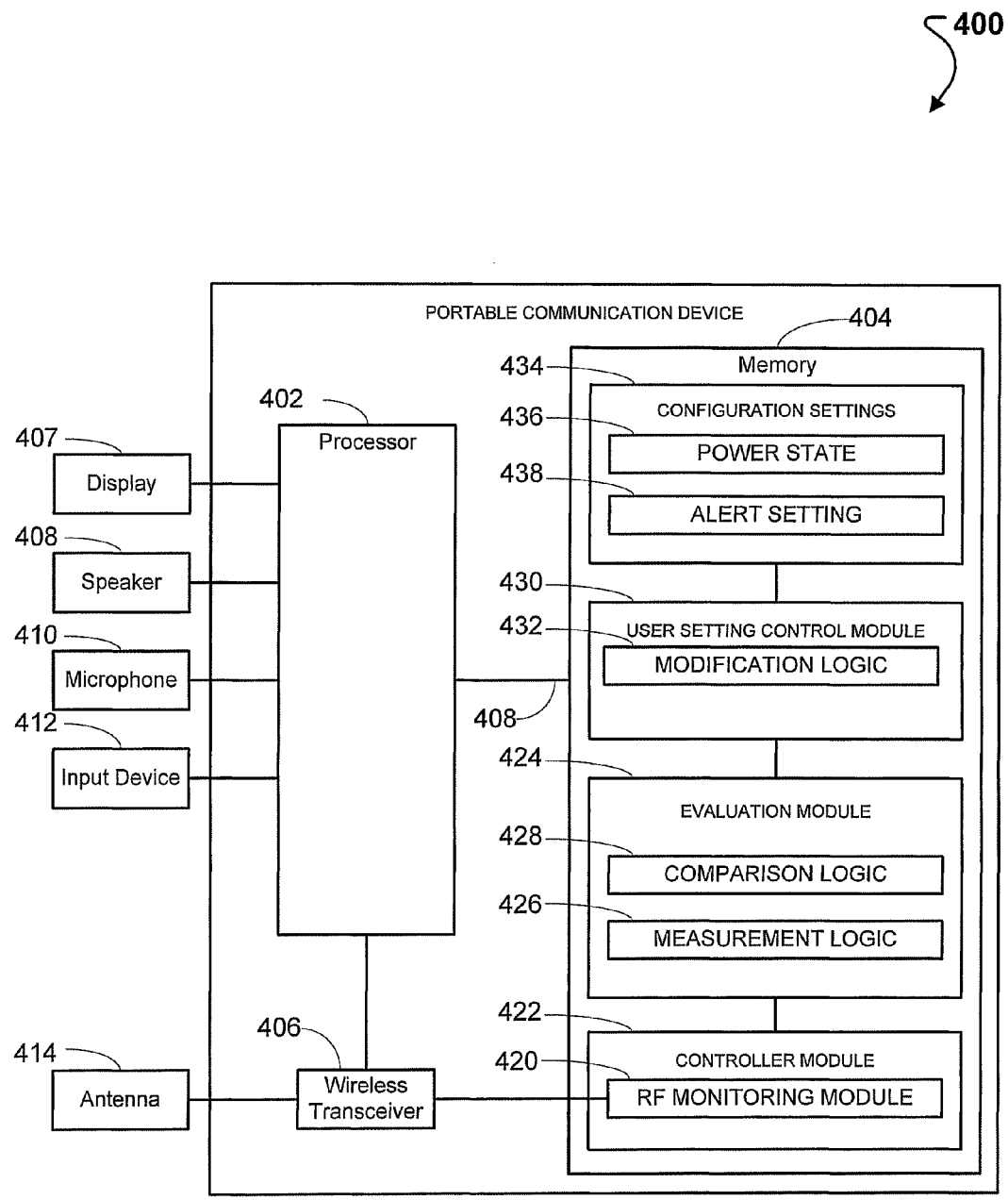
FIG. 4 is a block diagram of an illustrative embodiment of a portable communication device including logic to change configuration settings.

Referring to FIG. 4, a particular illustrative embodiment of a portable communication device is shown and is designated 400. As illustrated in FIG. 4, the portable communication device 400 includes a processor 402, a memory 404, and a wireless transceiver 406. A display 407, a speaker 408, a microphone 410, and an input device 412 are coupled to the processor 402. Further, an antenna 414 is coupled to the wireless transceiver 406.

As shown in FIG. 4, the portable communication device 400 may contain an RF monitoring module 420 coupled to the wireless transceiver 406. A controller module 422 directs the RF monitoring module 420. The portable communication device 400 has the capability of transmitting and receiving communications over a radio frequency range via the wireless transceiver 406. The RF monitoring module 420 is therefore capable of monitoring radio frequency signals within the RF range of the wireless transceiver 406 of the portable communication device 400. An evaluation module 424 includes measurement logic 426 and comparison logic 428. The measurement logic 426 measures a number of transmissions communicated by the RF signals during a designated time window, such as a first number of monitored transmissions of RF signals during a first time window or a second number of monitored transmissions of RF signals during a second time window. The comparison logic 428 compares the first number of monitored transmissions to the second number of monitored transmissions to estimate a change in transmission traffic. In one embodiment, the measurement logic 426 also measures an associated signal strength of each of the transmissions of RF signals during a designated time window.

The comparison logic 428 may select a subset of the transmissions where the measured signal strength exceeds a predetermined threshold signal strength. As noted above, the predetermined threshold signal strength may be used to exclude weak or moderate strength transmissions, in order to estimate a change in proximate device transmission traffic. Alternatively, the comparison logic 428 may include various algorithms to assign different weighting factors to the transmissions based on the measured signal strength.

A user setting control module 430 includes modification logic 432 to modify configuration settings 434 of the device based on the estimated change in transmission traffic. For example, a power state setting 436 and an alert setting 438 may be modified based on the estimated change in transmission traffic. The power state setting 436 may include a powered-on mode, a standby mode, a limited backlight mode, and a powered-off mode. The alert setting 438 may include a ringer volume, a ring tone, an audible alert mode, and inaudible alert mode. The inaudible alert mode may include a vibrate mode and a visual alert mode. In public locations, such as classrooms, funeral homes, libraries, movie theaters, meeting rooms, concert and performance halls, and churches, an audible alert signal may be considered disruptive or intrusive. In such locations, modifying the alert setting 438 of the portable communication device 400 from an audible alert mode to an inaudible alert mode or modifying the power state setting 436 (e.g., powering down the device 400) may be appropriate and convenient. Further, when the portable communication device 400 is no longer in the public location, automatically modifying the power state setting 436 or the alert setting 438 of the portable communication device 400 may be appropriate and convenient. For example, when exiting a movie theater, automatically changing the alert setting 436 from inaudible alert mode back to audible alert mode may be appropriate and convenient, as users may forget to manually change the alert setting 436.

Figure 5:
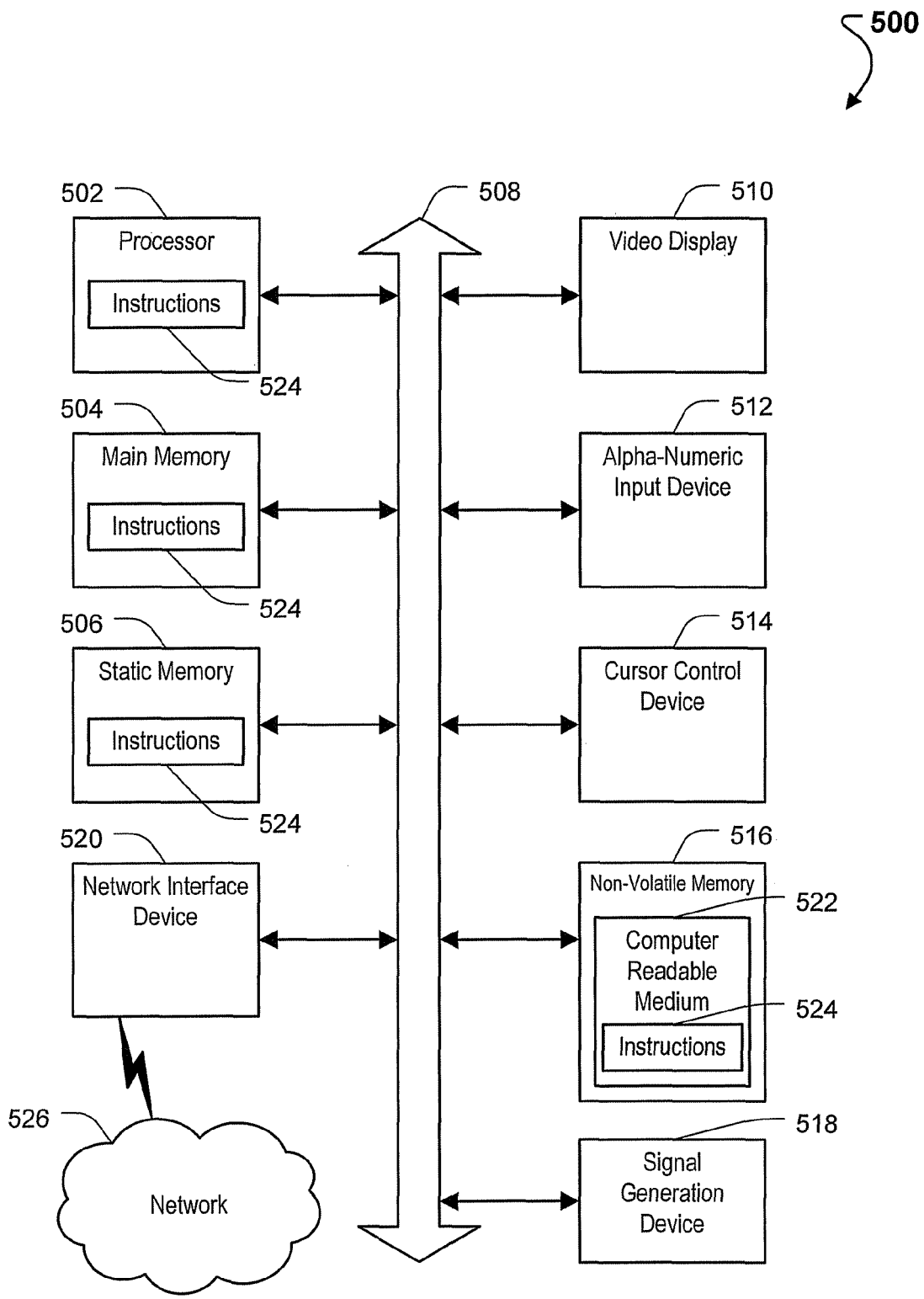
FIG. 5 is a block diagram of a representative embodiment of a general computer system.

Referring to FIG. 5, an illustrative embodiment of a representative computer system is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

The computer system 500 can be implemented as or incorporated into various devices, such as a mobile telephone, a portable communication device, a personal digital assistant (PDA), a laptop computer, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also include any electronic device or collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 can include a main memory 504 and a static memory 506, that can communicate with each other via a bus 508. As shown, the computer system 500 further includes a video display unit 510, such as a liquid crystal display (LCD). Additionally, the computer system 500 may include an input device 512, such as a keyboard or a cursor control device 514. The computer system 500 can also include non-volatile memory 516, such as a flash memory device, a signal generation device 518, such as a speaker, and a network interface device 520.

In a particular embodiment, as depicted in FIG. 5, the non-volatile memory 516 may include a computer-readable medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or the functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524, such as the JAVA applet or TSR application as described above, may be transmitted or received over the network 526 via the network interface device 520.

While the computer-readable medium is shown to be a single medium, the term "computer-readable medium" includes a single medium or multiple media. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for wireless communications (e.g., Global System for Mobile (GSM), Code Division Multiple Access (CDMA), Third Generation (3G), Fourth Generation (4G)), and Long Term Evolution (LTE)) represent examples of the state of the art. Such standards are periodically superseded by faster or more efficient standards having essentially the same or similar functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
monitoring radio frequency (RF) signals at a first portable communication device, wherein the RF signals include signals communicated by one or more other communication devices;
measuring a first number of transmissions communicated by the RF signals during a first time window;
measuring a second number of transmissions communicated by the RF signals during a second time window;
comparing the first number of transmissions to the second number of transmissions to estimate a first change in transmission traffic;
modifying a configuration setting of the first portable communication device from a first setting to a second setting based on the estimated first change in transmission traffic.

2. The method of claim 1, wherein monitoring RF signals at the first portable communication device includes monitoring RF signals without exchanging data between the first portable communication device and any of the other communication devices.

3. The method of claim 1, wherein monitoring RF signals at the first portable communication device includes monitoring RF signals communicated by the one or more other communication devices via at least one control channel.

4. The method of claim 1, wherein monitoring RF signals at the first portable communication device includes monitoring RF signals communicated by the one or more other communication devices via short-range RF signals.

5. The method of claim 1, wherein monitoring RF signals at the first portable communication device includes monitoring RF signals provided by at least one of: a Global System for Mobile (GSM) system; a Code Division Multiple Access (CDMA) system; a CDMA 2000 system; a Long Term Evolution (LTE) system; a Third Generation (3G) system; a Fourth Generation (4G) system; a Bluetooth system; a Wireless Fidelity (WiFi) system; a Worldwide Operability for Microwave Access (WiMAX) system; a Picocell system; a Femtocell system; and an Ultra-wideband (UWB) system.

6. The method of claim 1, further comprising:
measuring a third number of transmissions communicated by the RF signals during a third time window;
measuring a fourth number of transmissions communicated by the RF signals during a fourth time window;
comparing the fourth number of transmissions to the third number of transmissions to estimate a second change in transmission traffic;
modifying the configuration setting of the first portable communication device from the second setting to a third setting based on the estimated second change in transmission traffic.

7. The method of claim 1, wherein modifying the configuration setting of the first portable communication device includes changing a power state of the first portable communication device.

8. The method of claim 7, wherein changing the power state of the first portable communication device includes changing the power state to one of a powered-on mode, a standby mode, a limited backlight mode, and a powered-off mode.

9. The method of claim 1, wherein modifying the configuration setting of the first portable communication device includes modifying an alert setting of the first portable communication device.

10. The method of claim 9, wherein the alert setting includes at least one of a ringer volume, a ring tone, an audible alert mode, and an inaudible alert mode.

11. The method of claim 10, wherein the inaudible alert mode includes at least one of a vibrate mode and a visual alert mode.

12. A method, comprising:
monitoring radio frequency (RF) signals at a first portable communication device, wherein the RF signals include signals communicated by one or more other communication devices;
during a first time window, measuring a first number of transmissions communicated by the RF signals and measuring a first signal strength of each of the first number of transmissions;

selecting a first subset number of transmissions from the first number of transmissions, wherein the measured first signal strength of each of the first subset number of transmissions exceeds a predetermined threshold signal strength;

during a second time window, measuring a second number of transmissions communicated by the RF signals and measuring a second signal strength of each of the second number of transmissions;

selecting a second subset number of transmissions from the second number of transmissions, wherein the measured second signal strength of each of the second subset number of transmissions exceeds the predetermined threshold signal strength;

comparing the first subset number of transmissions to the second subset number of transmissions to estimate a first change in transmission traffic; and modifying a configuration setting of the first portable communication device from a first setting to a second setting based on the estimated first change in transmission traffic.

13. The method of claim 12, wherein monitoring RF signals at the first portable communication device includes monitoring RF signals without exchanging data between the first portable communication device and any of the other communication devices.

14. A portable communication device, comprising:
a radio frequency (RF) monitoring module to monitor RF signals at the portable communication device, wherein the RF signals include signals communicated by one or more other communication devices;
a controller module to direct the RF monitoring module;
an evaluation module including:
measurement logic to:
measure a first number of transmissions communicated by the RF signals during a first time window;
measure a second number of transmissions communicated by the RF signals during a second time window;
comparison logic to compare the first number of transmissions to the second number of transmissions to estimate a change in transmission traffic; and
a user setting control module including:
modification logic to modify a configuration setting of the portable communication device from a first setting to a second setting based on the estimated change in transmission traffic.

15. The device of claim 14, wherein the RF monitoring module monitors RF signals at the portable communication device without exchanging data between the portable communication device and any of the other communication devices, and wherein the one or more other communication devices include other portable communication devices or non-portable communication devices.

16. The device of claim 14, wherein the controller module directs the RF monitoring module to periodically scan a predetermined set of control channels.

17. The device of claim 14, wherein the user setting control module includes a virtual machine.

18. The device of claim 17, wherein the virtual machine includes a JAVA virtual machine (JVM).

19. The device of claim 18, wherein the JVM executes a JAVA Specification Request (JSR) applet.

20. The device of claim 14, wherein the user setting control module includes a Terminal State Resident (TSR) application.

* * * * *